(12) United States Patent
Irmer et al.

(10) Patent No.: US 8,968,627 B2
(45) Date of Patent: Mar. 3, 2015

(54) PROCESS FOR THE CONTINUOUS MANUFACTURING OF SHAPED ARTICLES AND USE OF SILICONE RUBBER COMPOSITIONS IN THAT PROCESS

(75) Inventors: Uwe Irmer, Leichlingen (DE); Dieter Wrobel, Leverkusen (DE); Yi-Feng Wang, Waterford, NY (US)

(73) Assignee: Momentive Performance Materials GmbH, Leverkusen (DE)

( * ) Notice: Subject to any disclaimer, the term of this patent is extended or adjusted under 35 U.S.C. 154(b) by 867 days.

(21) Appl. No.: 12/674,911

(22) PCT Filed: Jul. 4, 2008

(86) PCT No.: PCT/EP2008/058717
§ 371 (c)(1),
(2), (4) Date: May 10, 2010

(87) PCT Pub. No.: WO2009/027133
PCT Pub. Date: Mar. 5, 2009

(65) Prior Publication Data
US 2012/0027970 A1    Feb. 2, 2012

Related U.S. Application Data

(63) Continuation of application No. 11/848,480, filed on Aug. 31, 2007, now abandoned.

(51) Int. Cl.
| | |
|---|---|
| *B29C 35/08* | (2006.01) |
| *C08J 3/28* | (2006.01) |
| *C08G 77/20* | (2006.01) |
| *C08L 83/07* | (2006.01) |
| *B29D 23/00* | (2006.01) |
| *C08J 5/00* | (2006.01) |
| *C08L 83/04* | (2006.01) |
| *C08G 77/12* | (2006.01) |
| *C08G 77/18* | (2006.01) |
| *C08G 77/00* | (2006.01) |

(52) U.S. Cl.
CPC .. *C08J 5/00* (2013.01); *C08L 83/04* (2013.01); *C08G 77/12* (2013.01); *C08G 77/18* (2013.01); *C08G 77/20* (2013.01); *C08G 77/70* (2013.01); *C08G 77/80* (2013.01); *C08J 2383/04* (2013.01)
USPC ........... 264/477; 264/405; 264/464; 264/494; 264/495; 264/496; 522/66; 522/150; 522/172; 522/148; 524/588; 528/32; 528/33; 528/10; 428/35.7; 428/34.1; 425/174; 425/174.4

(58) Field of Classification Search
USPC .......... 428/35.7, 34.1; 525/50, 474, 477, 478; 522/66, 148, 150, 172; 264/405, 464, 264/477, 494, 495, 496; 524/588; 528/10, 528/32, 33; 425/174, 174.4
See application file for complete search history.

(56) References Cited

U.S. PATENT DOCUMENTS

| | | | |
|---|---|---|---|
| 3,022,543 A | 2/1962 | Baird et al. | |
| 3,773,870 A | 11/1973 | Spillers | |
| 4,600,484 A * | 7/1986 | Drahnak | 204/157.74 |
| 6,127,446 A | 10/2000 | Butts | |
| 7,511,110 B2 | 3/2009 | Fehn | |
| 8,283,025 B2 * | 10/2012 | Zhu | 428/216 |
| 2005/0167892 A1 | 8/2005 | Jermann et al. | |
| 2005/0221033 A1 | 10/2005 | Procida | |
| 2006/0058484 A1 | 3/2006 | Fehn et al. | |
| 2006/0135689 A1 | 6/2006 | Fehn | |
| 2006/0260739 A1 | 11/2006 | Varkey | |
| 2007/0003650 A1 | 1/2007 | Schroeder | |
| 2007/0296123 A1 | 12/2007 | Harjuhahto | |
| 2008/0033071 A1 * | 2/2008 | Irmer et al. | 522/66 |
| 2008/0114091 A1 | 5/2008 | Malwitz et al. | |
| 2010/0222447 A1 | 9/2010 | Jackson et al. | |

OTHER PUBLICATIONS

International Search Report for corresponding PCT/EP2008/058717 mailed Jan. 4, 2010, five pages.
International Report on Patentability for corresponding PCT/EP2008/058717 mailed Mar. 11, 2010, ten pages.

* cited by examiner

*Primary Examiner* — Sanza McClendon
(74) *Attorney, Agent, or Firm* — Rankin, Hill & Clark LLP

(57) ABSTRACT

The present invention relates to a process for the manufacturing of continuously shaped cured silicone articles, particularly extrusions articles and the use of silicone compositions containing a photoactivatable metal catalyst in said process, wherein the curing is initiated by visible or UV-light.

22 Claims, No Drawings

PROCESS FOR THE CONTINUOUS MANUFACTURING OF SHAPED ARTICLES AND USE OF SILICONE RUBBER COMPOSITIONS IN THAT PROCESS

This application is a continuation of U.S. application Ser. No. 11/848,480 filed 31 Aug. 2007, now abandoned.

The invention relates to a process for the continuous manufacturing of shaped articles, particularly extrusions articles and the use of silicone rubber compositions in that process, wherein the curing is initiated by visible or UV light.

The silicone rubber polymers according to the prior art comprise polydimethyl-siloxanes having a certain amount of vinyl groups attached to silicon.

In the known industrial extrusion processes the rubber compositions are thermally cured either with highly reactive peroxides or silicone hydride crosslinkers and metal catalysts to continuously extruded shaped articles. But there are a lot of restrictions about the process conditions for the manufacture of such extruded shaped articles.

Since the silicone compositions to be cured thermally require a certain period of heating, the extrusion rate and possibly the thickness of the extrudates are to be limited in order to provide sufficient extrudate temperature, in order to achieve sufficient curing in a reasonable time. Accordingly the processes for thermally curable rubbers of the prior art must either provide high temperatures along the extrusion line or provide a long pathway while shifting the surface temperatures to a higher level.

Otherwise if the cure is not almost complete the continuously shaped article cannot be wound continuously on rolls and the like for storage and further cutting or packing.

Therefore the usually applied means for heating, such as ovens, salt baths, steam chambers or channels have a length of up to 20 m in order to safeguard sufficient curing at high speed.

Further problems of thermally curing systems result from the use of some of the high reactive peroxides such as bis-2,4-dichlorobenzoyl peroxide, 2-monchloro or 4-monochloro-benzoyl peroxide as curing catalyst in current silicone rubber extrusion processes. Such catalyst generates unavoidably by-products under the cure such as chlorobenzoic acids, which can weaken the mechanical properties of the cured rubbers by so-called reversion. This effect has negative impact upon sealing, compression set, and the dynamic resistance of the shaped articles. Another disadvantage are biphenyls generated as trace by-products and the malodor of these or other by-products. In order to separate such by-products e.g. for complying with common food and health related governmental requirements an additional secondary post-curing operation is necessary, involving additional handling, delays, and costs.

Furthermore the reactive compositions including peroxides as well as metal catalysts have a limited shelf life or potting life under storage conditions at room temperature. This time restricts the period of storage time wherein extrusion is still possible without showing negative effects such as scorching initiated by premature cure. The resulting negative effects include rough surfaces or higher die swelling after extrusion and finally the higher degree of scorching decreases the extrusion rates.

Peroxide based systems having an appropriate cure rate may have pot life times up to one months at 25° C. whereas metal catalyzed systems can only be stored for 1-10 hours. The latter therefore are often designed as 2-component systems whereby the final reactive one-component mass composition is formed immediately before extrusion. In some cases storage under cooling below room temperature may extent the time for scorching.

Furthermore the wall temperature of the ovens in the currently preferred shaping processes for thermally cured systems can run up to 500° C., but usually is 250 to 450° C. Therefore the surface temperature of the articles is around 100-350° C. and can increase up to 500° C. in case of a standstill. In such a case this temperature destroys the silicone rubber to give a kind of a hard ash and other volatile oxidation products. Also, the need of a high temperature level for curing extruded silicone rubber compositions requires sufficient ventilation, in particular, in view of thermal decomposition of the silicone rubber in case of a standstill in the heating channels.

Also the strong temperature gradient and low heat transfer rates of the silicone compositions may result in reversion and surface embrittlement on the extruded articles leading to crazing during modest extension and the so-called reversion leading to depolymerisation. Reversion means that network weakening or depolymerisation takes place by e.g. the reaction of splitting products like water or organic acids that are enclosed at such high temperature levels particularly in thick walled articles with the polymer.

The surface temperature of thick walled articles can increase up to more than 300° C. while the inner part of the article has a much lower temperature so that the thick-walled article is not completely cured in the inner parts.

In view of the possible deterioration of the surface of the extrudates, a higher temperature cannot compensate the lack of incomplete cure. Accordingly lower extrusion rates are required in order to increase residence times of the extrudates in the oven, i.e. the efficiency is reduced.

Another problem of thermally curing systems may result, when co-extrudates, like for example seals, insulations or sheathings, with other materials are to be prepared. One example may be the manufacture of sheathed cables where the final sheathing should contact smoothly upon the underlying substrate, e.g. an insulated cable. If the entrapped air under sheathing gets heated too strongly and the rubber is not yet cured bubbles may appear between cable and sheathing. Not only here but also in case of ordinary extrusion of thick-walled articles bubbles or micro bubbles may be a problem particular caused by low curing rates at higher temperatures. Bubbles and thermal shrinkage are therefore a general challenge if the curing rate is too low at high temperatures.

Other processes known in the prior art for the continuous manufacturing of shaped articles, made out of silicone rubber either apply ionizing high energy radiation such as gamma radiation (wave lengths of less than 0.5 nm) or radiation of accelerate electrons (Van-de-Graaff generator). Such processes do not achieve sufficient cure rates under the condition of extrusion i.e. short residence times and requires high investments for the radiation sources.

For example, U.S. Pat. No. 4,490,314 discloses a process wherein polydimethylsiloxanes having different functional groups are cured in the presence of ammonia or amines and high energy ionizing radiation. U.S. Pat. No. 5,346,932 teaches how one can thermally cure a non colored silicone rubber with microwaves having a frequency between 3000 to 10000 MHz (wavelength of 3-10 cm) when using selected silicas.

WO 2006/-010763 dikloses light curable siloxane compositions comprising sigma platinum catalysts and polymers having viscosities up to 10 Pa·s useful for coatings, casting and molded parts.

US 2006/135689 describes polyorganosiloxane compositions comprising platinum catalysts having cyclic or bicyclic dienes as pi-ligands which can extend the pot life of thermally curable silicone rubbers useful in casting, different extrusion and molding processes.

U.S. Pat. No. 6,376,569 discloses polydimethylsiloxanes comprising sigma platinum catalysts and a free radical photoinitiator, wherein the chain length of the polydimethylsiloxanes is up to about 3000 diorganosiloxy units.

The light curable silicone composition known in prior art are either low viscous compositions or cannot be used in an efficient industrial extrusion process, because the curing rate is too low.

Polysiloxane compositions comprising low viscous polymers, i.e. a polymer with a short chain length cannot be used in an extrusion process where a minimum of 'green strength' is a precondition for pulling the uncured, extruded shaped strand, leaving the extrusion die, through the curing facilities. Also the shape of the article cannot be maintained until the extruded article is cured.

Other light curable silicone compositions are based on organofunctional groups like acrylates, epoxides, thiols which provide neither cured silicone rubbers having stable mechanical properties after heat ageing nor good mechanical properties at room temperatures, nor sufficient cure rates, nor are they free of malodors.

In order to resolve the above mentioned problems of the prior art there has been provided a continuous process for the manufacture of continuously shaped cured silicone articles, comprising the following steps:

a) a shaping step, comprising the continuously shaping of a mixture comprising:
  (i) at least one linear polyorganosiloxane having at least three alkenyl groups and an average number of diorganosiloxy units determined by GPC with polystyrene as standard of at least 3000,
  (ii) optionally one or more polyorganosiloxane having alkenyl groups, other than the polyorganosiloxane according to the component (i),
  (iii) at least one polyorganosiloxane having at least two SiH groups,
  (iv) at least one photoactivatable transition metal catalyst,
  (v) optionally, one or more filler,
  (vi) optionally one or more conventional additives,
in a shaping apparatus, thereby obtaining a shaped silicone article,
b) at least one irradiation step to photoactivate the photoactivatable transition metal catalyst,
c) optionally one or more heat treatment steps,
d) optionally one or more mixing steps,
e) optionally one or more cutting and/or winding and/or packaging steps of the continuously shaped cured silicone article.

A continuous process according to the present invention—in contrast to a batch process—relates to the manufacture of endless (continuously) shaped articles (like tubes, profiles, strands, insulations of endless articles) through a die, in contrast to an article that is discontinuously prepared by filling a mould and releasing the article from the mould after curing.

Component (i) to be used in the shaping step a) of the process of the invention is at least one linear polydiorganosiloxane having at least three alkenyl groups and an average number of diorganosiloxy units determined by GPC with polystyrene as standard of at least 3000 as number average mol weight of the linear molecules.

Preferably the linear polyorganosiloxane corresponding to component (i) has at least 5, more preferably at least 10 alkenyl groups in order to provide suitable cross-linking density.

Preferably the linear polyorganosiloxane corresponding to component (i) has a maximum number of 100 alkenyl groups, still more preferably of 50 alkenyl groups, because otherwise the reactivity of the polyorganosiloxane may decrease.

The preferred viscosity range of the polyorganosiloxane(s) (i) used according to the invention is preferably at least 1.5 kPa*s, more preferably 5 kPa*s, more preferably 10 kPa*s, more preferably 15 kPa*s (25° C.; at a shear rate of 1 s$^{-1}$). Such a viscosity is preferred in order to achieve a suitable viscosity (green strength) of the mixture to be shaped, in particular, to be extruded (in the following abbreviated as "shaping mixture", in particular, "extrusion mixture").

The polyorganosiloxane(s) (i) having at least three alkenyl groups may have pendant and terminal alkenyl groups. "Pendant alkenyl groups" in accordance with the present invention is intended to mean an alkenyl group of a R(alkenyl)SiO (D$^{alkenyl}$) or (alkenyl)SiO$_{3/2}$ (T$^{alkenyl}$) group. "Terminal alkenyl groups" in accordance with the present invention is intended to mean an alkenyl group of a M$^{alkenyl}$ group. Preferably the polyorganosiloxane(s) (i) in average have at least one pendant alkenyl group, more preferably at least two pendant alkenyl groups, still more preferably at least three pendant alkenyl groups. Most preferably polyorganosiloxane(s) (i) are used that have two terminal alkenyl groups and at least one pendant alkenyl group in addition.

The use of such polyorganosiloxane(s) (i), in particular those having at least one, preferably at least three pendant alkenyl groups, and optionally two terminal alkenyl groups in addition, in the continuous shaping, in particular, extrusion process of the present invention, generally provides a sufficient cross-linking density obtained upon irradiation, i.e. satisfactory mechanical properties, like low permanent set and high recovery properties after any deformation.

The linear polyorganosiloxane (i) having at least three alkenyl groups preferably has an average number of diorganosiloxy units $P_n$ determined by GPC with polystyrene as standard of at least 3000, more preferably at least 3500, more preferably at least 4000, and still more preferably 5000 to 12000. Pn is determined by the equation $P_n=(M_n/$molecular weight of the repeating siloxy unit). The $M_n$ value is the number average molecular weight wherein the low molecular weight polyorganosiloxanes up to 10 siloxy units are not counted. These low molecular weight polyorganosiloxanes are mainly comprised of cyclic polyorganosiloxanes.

The polyorganosiloxanes (i) to be used in accordance and in particular the polyorganosiloxanes (i), having the preferred viscosity, are essentially linear, i.e. being composed of M and D units.

However, in addition to those linear polyorganosiloxanes (i) there might be used low molecular branched alkenyl polyorganosiloxanes having an average number of siloxy units of about less than 1000 to a certain extent, in particular less than 30 weight-% based on the total amount of the mixture to be shaped. Such branched alkenyl polyorganosiloxanes are comprised by the definition of component (ii). These low molecular low molecular branched alkenyl polyorganosiloxanes may be part of the mixture to be shaped, in order to increase cross-linking density.

The average content of the alkenyl groups in the linear polyorganosiloxane(s) (i) is preferably from about 0.02 to 1.57 mol. % Si alkenyl groups related to the number of silicon atoms in the linear polyorganosiloxane(s) (i) (corresponding to about 0.003 to about 0.21 mmol/g SiVi), more preferably from 0.08 to 0.7 mol. % (corresponding to about 0.01 to 0.095 mmol/g SiVi). The alkenyl content is determined here by way of $^1$H NMR—see A. L. Smith (ed.): The Analytical Chemistry of Silicones, J. Wiley & Sons 1991 Vol. 112 pp. 356 et seq. in Chemical Analysis ed. by J. D. Winefordner.

The preferred polydiorganosiloxanes (i) can be described by the general formula (I):

(I), in which x is preferably 0, 1, 2 or 3, preferably 1, a is an average value and is in the range of 0 to 100, preferably 1 to 50, more preferably 1 to 20, b is an average value and is in the range of 3000 to 12000, preferably 3500, more preferably 4000, and still more preferably 5000 to 11000, more preferably 6000 to 10000, with the proviso that the polydiorganosiloxanes (i) of the general formula (I) have at least three alkenyl groups, R=a saturated organic group, preferably unsubstituted or substituted hydrocarbon radicals, more preferably n-, iso-, tert- or $C_1$-$C_{12}$-alkyl, $C_1$-$C_{12}$-alkoxy($C_1$-$C_{12}$)alkyl, $C_5$-$C_{30}$-cycloalkyl or $C_6$-$C_{30}$-aryl, $C_1$-$C_{12}$-alkyl($C_6$-$C_{10}$)aryl, each of these radicals R can have substitution by one or more F atoms and/or can contain one or more —O— groups, $R^1$=an unsubstituted or substituted $C_2$-$C_{12}$-alkenyl radical, these preferably being selected from: unsubstituted and substituted alkenyl-containing hydrocarbon radicals, such as n-, iso-, tert-, or cyclic $C_2$-$C_{12}$-alkenyl, vinyl, allyl, hexenyl, $C_6$-$C_{30}$-cycloalkenyl, cycloalkenylalkyl, norbornenylethyl, limonenyl, $C_8$-$C_{30}$-alkenylaryl, in which, if appropriate, one or more —O— atoms can be present (corresponding to ether radicals) and the radicals can have substitution by one or more F-atoms.

Preferred examples of suitable monovalent hydrocarbon radicals R include alkyl groups, preferably $CH_3$, $CH_3CH_2$, $(CH_3)_2CH$, $C_8H_{17}$ and $C_{10}H_{21}$ groups, cycloaliphatic groups, such as cyclohexylethyl, aryl groups, such as phenyl, tolyl, xylyl, aralkyl groups, such as benzyl and 2-phenylethyl groups. Preferred monovalent halogenated hydrocarbon radicals R in particular have the formula $C_nF_{2n+1}CH_2CH_2$—, where n is from 1 to 10, examples being $CF_3CH_2CH_2$—, $C_4F_9CH_2CH_2$—, and $C_6F_{13}CH_2CH_2$—. A preferred radical is the 3,3,3-trifluoropropyl group.

Particularly preferred radicals R include methyl, phenyl, and 3,3,3-trifluoropropyl.

Preferred radicals $R^1$ are groups such as vinyl, allyl, 5-hexenyl, cyclohexenylethyl, limonenyl, norbornenylethyl, ethylidenenorbornyl, and styryl, particular preference being given to vinyl.

In accordance with the invention it is possible to use a mixture of different polyorganosiloxanes (i) having different alkenyl contents, preferably vinyl contents in order to improve the mechanical properties, such as tensile strength and tear propagation resistance of the shaped crosslinked or cured silicone rubber articles.

In accordance with the present invention for example a mixture of a vinyl-rich polyorganosiloxane (I') and a vinyl-poor polyorganosiloxane (II') (having a lower content of vinyl groups than the vinyl-rich polyorganosiloxane) in a weight ratio of 100:0.5 to 1:10, preferably 10:1 to 1:1 may be used, in order to suitably adjust satisfactory mechanical properties, like elongation, tear strength, permanent set.

Furthermore in accordance with the present invention it is possible to use in addition to the polyorganosiloxanes (i) comprising at least three alkenyl groups, polyorganosiloxanes, which are essentially linear alkenyl-endcapped polyorgano-siloxanes having one alkenyl group on each terminal siloxy group (one of the possible components (ii)). Such alkenyl polydiorganosiloxanes have two alkenyl groups and are for example of the following formula (II"):

(II'), in which the index "u" is an average value and is in the range of 3000 to 12000, preferably 5000 to 11000, more preferably 6000 to 10000, and R and $R^1$ have the same meanings as given above for formula (I).

The addition of those linear alkenyl-endcapped polyorganosiloxanes having one alkenyl group on each terminal siloxy group may help in maximizing the elongation and tear strength of the cured continuously shaped silicone articles, prepared with the process of the invention.

In order to provide silicone mixtures to be shaped and cured having a good balance between cross-linking velocity and cross-linking density the alkenyl (in particular vinyl content of all polyorganosiloxane(s) in the mixture to be shaped (not only the polyorganosiloxane(s) in accordance with the definition of component (i)) should be set as high as possible, in particular, to at least 0.03 mol-% Si alkenyl (corresponding to at least 0.004 mmol/g SiVi).

At the same time, however, the content of vicinal alkenyl groups in the uncured mixture of components (i) to (vi) soluble in $CDCl_3$ at 25° C. determined by $^{29}$Si-NMR spectroscopy preferably should be less than 0.025 mol. %.

The term "vicinal alkenyl groups" used in accordance with the present invention means alkenyl groups attached to two neighboring silicon atoms.

The content of vicinal alkenyl groups in the uncured mixture of components (i) to (vi) is measured by $^{29}$Si-NMR spectroscopy in accordance to Maris J. Ziemelis and J. C. Saam, presented at the $132^{nd}$ Meeting Rubber Division, American Chemical Society Cleveland, Ohio Oct. 6-9, 1987.

In particular the uncured mixture of components (i) to (vi) is mixed with $CDCl_3$ in a weight-ratio of 30 wt-% of the uncured mixture of components (i) to (vi) and 70 wt-% of $CDCl_3$ with the exclusion of curing-inducing light. Thereafter the mixture is optionally centrifuged. To the resulting dispersion is 0.8 wt. % of $Cr(AcAc)_3$ is added, and the dispersion is subjected to $^{29}$Si-NMR spectroscopy measurement.

The content of vicinal Si-alkenyl groups in the component (i) is measured in the same manner.

The method to determine the concentration of vicinal Si alkenyl groups of the uncured mixture is exemplified for the preferred vinyl groups attached to silicon atoms. The Si atoms in the $^{29}$Si-NMR spectroscopy having vicinal vinyl groups as preferred embodiment of the invention have a chemical shift of −35.47 to −34.89 ppm. The molar concentration of the vicinal Si vinyl groups is thus calculated by:

Integral of the Si atoms in the range of −35.47 to −34.89 ppm/Integral over all Si atoms×100%.

Apart from this it is possible in the practice of the invention, in particular, in the manufacture of the mixture to be cured; to control the content of the vicinal Si alkenyl, in particular, vinyl groups, by calculating the content of the vicinal Si alkenyl groups, in particular, vinyl groups as follows:

Such method follows the equation:

(mol. % $Si^{vicinal\ vinyl}$)=(mol. % $Si^{vinyl}$*mol. % $Si^{vinyl}$), wherein $Si^{vinyl}$ is determined as follows:

For each alkenyl containing polyorganosiloxane in the mixture the content of the vinyl groups $Si^{vinyl}$ is determined by $^1$H-NMR spectroscopy, and for each alkenyl containing polyorganosiloxane the content of the vicinal Si alkenyl groups is calculated according to the formula:

$$(\text{mol. \% Si}^{vicinal\ vinyl}) = (\text{mol. \% Si}^{vinyl} * \text{mol. \% Si}^{vinyl}).$$

Then the individual vicinal Si vinyl contents in mol. % are multiplied with the relative weight in % (related to the total weight of all alkenyl containing polyorganosiloxanes) of each alkenyl containing polyorganosiloxane, and the sum of all such products is divided by 100. For example, if there are three alkenyl containing polyorganosiloxane in the mixture to be cured, ×1, ×2 and ×3, having a vicinal Si vinyl content (mol. % Si$^{vicinal\ vinyl}$) of 0.03, 0.05 and 0.1 mol. %, respectively, and a weight percentage of 20, 30 and 50 wt-%, respectively, then the Si$^{vicinal\ vinyl}$ is calculated as follows:

$$(0.03 \times 20 + 0.05 \times 30 + 0.1 \times 50)/100 = (0.6 + 0.15 + 5)/100 = 0.0575 \text{ mol. \%}.$$

As a first approximation the content of vicinal Si alkenyl groups calculated in this manner can be used to adjust the content of vicinal Si alkenyl groups determined by $^{29}$Si-NMR-spectroscopy as explained above.

If the alkenyl content of all polyorganosiloxane(s) in the mixture to be shaped is less than 0.03 mol-% the cross-linking density may be too low to provide satisfactory mechanical properties, (i.e. the permanent set and the elongation may be too high).

If the part of the uncured mixture of the components (i) to (vi), which is soluble in CDCl$_3$ at 25° C., has a content of vicinal Si-alkenyl groups of more than 0.025 mol. %, then the curing rate may be too slow in order to ensure economical extrusion line speeds. A higher content of vicinal alkenyl groups may be possible, but, however, would require higher catalyst concentrations, which are again not desirable under economical aspects. Under certain circumstances, where an increased pot life is desired, it may be feasible, however, to adjust a total content of vicinal alkenyl groups above 0.025 mol-%.

More preferably the content of the vicinal alkenyl groups in the polyorganosiloxane (i) is less than 0.01 mol-%, and more preferred the content is less than 0.005 mol-%. still more preferred less than 0.001 mol-%.

In the present invention alkenyl-substituted polyorganosiloxanes other than the polyorganosiloxanes (i), which are referred to in this document as components(s) (ii) such as the essentially linear alkenyl-endcapped polydiorganosiloxanes having one alkenyl group on each terminal siloxy group, i.e. two alkenyl groups, described before, may be used in the mixture to be shaped in accordance with the continuous process of the invention. Such alkenyl-substituted polyorganosiloxanes (ii) other than the polyorganosiloxane(s) (i) may include for example also those having a lower number of diorganosiloxy units than 3000.

Polyorganosiloxanes (i) with a content of the vicinal alkenyl groups of less than 0.025 mol % may be prepared by equilibration polymerization reaction using basic or acidic catalysts using both the various cyclosiloxanes, and linear polyorganosiloxanes, and also symmetrical 1,3-divinyltetramethyldisiloxane, and other relatively long-chain siloxanes having a trialkylsiloxy end cap or SiOH end groups. Examples of those used for this purpose are the hydrolysates of different alkylchlorosilanes, e.g. vinyldimethylchlorosilane and/or dimethyldichlorosilane, other examples being the trialkyl-terminated siloxanes per se obtained therefrom or these in a mixture with other siloxanes.

The component(s) (iii) are preferably selected from linear, cyclic or branched SiH-containing polyorganosiloxanes of the general formula (III):

$$[M_{a2}D_{b2}T_{c2}Q_{d2}R^2_{e2}]_m \quad (III)$$

in which
M=R$^3$R$_2$SiO$_{1/2}$,
D=R$^3$RSiO$_{2/2}$,
T=R$^3$SiO$_{3/2}$,
Q=SiO$_{4/2}$, in which
R=n-, iso-, tert- or C$_1$-C$_{12}$-alkyl, C$_1$-C$_{12}$-alkoxy(C$_1$-C$_{12}$) alkyl, C$_5$-C$_{30}$-cycloalkyl or C$_6$-C$_{30}$-aryl, C$_1$-C$_{12}$-alkyl(C$_6$-C$_{10}$)aryl, each of these radicals R can have substitution by one or more fluorine atoms and/or can contain one or more —O— groups,
R$^3$=R, R$^1$ or hydrogen, with the proviso that at least two radicals R$^3$ per molecule are hydrogen, and both here can occur simultaneously in one molecule, but at least two radicals R$^3$ per molecule are hydrogen attached to a silicon atom, R being defined above, R=methyl and R$^1$=vinyl, if present, being preferred.
R$^2$=a divalent aliphatic n-, iso-, tert-, or cyclic C$_1$-C$_{14}$-alkylene radical, or a C$_6$-C$_{14}$-arylene or, respectively, alkylene-aryl radical, which in each case bridges two siloxy units M, D or T,
m=from 1 to 1000
a2=from 1 to 10
b2=from 0 to 1000
c2=from 0 to 50
d2=from 0 to 1
e2=from 0 to 300.

The polyhydrogensiloxanes (iii) are preferably linear, cyclic, or branched polyorganosiloxanes whose siloxy units have advantageously been selected from M=R$_3$SiO$_{1/2}$, M$^K$=R$_2$HSiO$_{1/2}$, D=R$_2$SiO$_{2/2}$, D$_H$=RHSiO$_{2/2}$, T=RSiO$_{3/2}$, T$^H$=HSiO$_{3/2}$, Q=SiO$_{4/2}$ in which these units are preferably selected from MeHSiO units and Me$_2$HSiO$_{0.5}$ units alongside, if appropriate, other organosiloxy units, preferably dimethylsiloxy units.

The siloxy units present in the component (iii) can be linked to one another in the polymer chain, blockwise or randomly. Each siloxane unit of the polysiloxane chain can bear identical or different radicals of the group R.

The indices of the formula (III) describe the average degree of polymerization P$_n$, measured as number average M$_n$, determined by GPC (polystyrene as standard) these being based on polyhydrogenmethylsiloxane and, within the prescribed viscosity limits, is to be appropriately adjusted on the basis of siloxy groups using other substituents with other molecular weights.

The polyhydrogensiloxane (iii) in particular encompasses all of the liquid, flowable, and solid polymer structures of the formula (III) with the degrees of polymerization resulting from the indices stated above. Preference is given to the polyhydrogensiloxanes (iii) whose molar mass is smaller than about 60 000 g/mol, preferably smaller than 20 000 g/mol.

The preferred polyhydrogensiloxanes (iii) have structures which are selected from the group which can be described via the formula (IIIa-IIIe)

$$HR_2SiO(R_2SiO)_z(RHSiO)_pSiR_2H \quad (IIIa)$$

$$HMe_2SiO(Me_2SiO)_z(MeHSiO)_pSiMe_2H \quad (IIIb)$$

$$Me_3SiO(Me_2SiO)_z(MeHSiO)_pSiMe_3 \quad (IIIc)$$

$$Me_3SiO(MeHSiO)_pSiMe_3 \quad (IIId)$$

$$\{[R_2R^3SiO_{1/2}]_{0-3}[R^3SiO_{3/2}][R^4O]_{n2}\}_{m2} \quad (IIIe)$$

$$\{[SiO_{4/2}][R^4O_{1/2}]_{n2}[R_2R^3SiO_{1/2}]_{0.01\text{-}10}[R^3SiO_{3/2}]_{0\text{-}50}[RR^3SiO_{2/2}]_{0\text{-}1000}\}_{m2} \quad (IIIf)$$

where
z=from 0 to 1000
p=from 0 to 100
z+p=b4=from 1 to 1000
n2=from 0.001 to 4
m2=from 1 to 1000
in which $R^4O_{1/2}$ is an alkoxy radical on silicon, and $R^3$ is defined as above.

One preferred embodiment of the class (IIIe) and (IIIf) compound is provided by way of example by monomeric to polymeric compounds which can be described via the formula $[(Me_2HSiO_{0.5})_k SiO_{4/2}]_{m2}$ wherein k can have integer or decimal values from 0.01 to (2*m$_2$+2).

The concentration of SiH is preferably in the range from 0.5 to 100 mol. % related to silicon atoms, or 0.1 to 17 mmol/g based on polyhydrogen-methyl-siloxanes and, within the prescribed viscosity limits, is to be appropriately adjusted on the basis of siloxy groups using other substituents.

In one preferred embodiment of the invention, the polyorganohydrogensiloxane (iii) is composed of at least one polyorganohydrogensiloxane (iii-1) having per average two Si—H groups per molecule and of at least one polyorganohydrogensiloxane of type (iii-2) having more than two Si—H groups per molecule. In this embodiment, component (iii) is composed of at least two different polyorganohydrosiloxanes (iii), which produce different crosslinking structures, in order to give high-strength silicone elastomeric shaped articles. Bifunctional polyorganohydrogensiloxanes (iii-1) act as so-called chain extenders, and the polyhydrogensiloxanes (iii-2) of relatively high functionality (>2) act as crosslinking agents. The silicone composition to be shaped used according to the invention preferably comprises at least one bifunctional chain extender (iii-1) and at least one crosslinking agent (iii-2).

Examples of preferred structures of component (iii-1) in the inventive silicone rubber composition include chain extenders (iii-1) such as:
$HMe_2SiO\text{-}(Me_2SiO)_z SiMe_2H$, and
$Me_3SiO\text{-}(Me_2SiO)_z(MeHSiO)_2 SiMe_3$
$[(Me_2SiO)_z(MeHSiO)_2]$ The crosslinking agents (iii-2) comprise compounds such as:
$Me_3SiO\text{-}(MeHSiO)_p SiMe_3$,
$HMe_2SiO(Me_2SiO)_z(MePhSiO)_z(MeHSiO)_p SiMe_2H$,
$(MeHSiO)_p$,
$(HMe_2SiO)_4 Si$
$MeSi(OSiMe_2H)_3$,
in which p and z are defined as above.

Mixtures of this type composed of what are known as chain extenders and crosslinking agents can be used by way of example as described in U.S. Pat. No. 3,697,473.

In a further preferred embodiment, the amount of components (iii-1) and (iii-2) is
from 0 to 70 mol-% of (iii-1), and
from 30 to 100 mol-% of (iii-2), based on (iii-1) and (iii-2).

If it is necessary to still further increase the cure rate, this can by way of example be achieved via an increase of the ratio of SiH to alkenyl, or an increased amount of catalyst (iv), or an increase in the proportion of polyorganosiloxanes (iii-2) which contain $HMe_2SiO_{0.5}$ units.

The polyorganosiloxanes (iii) are preferably siloxane-soluble and, respectively, liquid at room temperature, i.e. preferably have fewer than 1000 siloxy units, i.e. preferably have viscosities below 40 Pa·s at 25° C. and D=1 s$^{-1}$.

The chain length of the crosslinking agents as component (iii-2), which are mainly composed of MeHSiO units, is preferably from 3 to 200, particularly preferably being from 15 to 60 MeHSiO units.

The chain length of the chain extenders as component (iii-1), these being mainly composed of $Me_2SiO$ units and $HMe_2SiO_{1/2}$, is preferably from 2 to 100, particularly preferably being from 2 to 60 $Me_2SiO$ units.

The SiH content in the present invention is determined by way of $^1H$ NMR, see A. L. Smith (ed.): The Analytical Chemistry of Silicones, J. Wiley & Sons 1991 Vol. 112 pp. 356 et seq. in Chemical Analysis ed. by J. D. Winefordner.

The polyhydrogensiloxanes (iii) can be prepared by processes known per se, e.g. using acidic equilibration or condensation, as disclosed by way of example in U.S. Pat. No. 5,536,803. The polyhydrogensiloxanes (iii) can also be reaction products generated by a hydrosilylation reaction of organohydrosiloxanes using siloxanes containing smaller amounts of alkenyl groups in the presence of a hydrosilylation catalyst, where the resultant excess SiH content is preferably within the limits defined above. This gives organohydrogensiloxanes (iii) bridged by alkylene groups such as $R^2$ groups.

The polyhydrogensiloxanes (iii) can moreover also be reaction products which have come from condensation of, for example, organohydrogenalkoxysiloxanes (iii) using hydroxy- or alkoxysilanes and, respectively, siloxanes, e.g. as described in U.S. Pat. No. 4,082,726, e.g. columns 5 and 6.

According to the invention, it is preferable to select the ratio of component (iii) to component (i) and optionally present component (ii) in such a way that the molar ratio present of Si—H to Si-alkenyl units is from about 0.5 to 20:1, preferably from 1 to 3:1.

The preferred amount of the polyhydrogensiloxanes (iii) is from 0.1 to 200 parts by weight, based on 100 parts by weight of component (i) and optionally present component (ii).

Many properties, such as vulcanizate properties, crosslinking density, stability, and surface tack, can be influenced by way of the ratio of SiH units to Si-alkenyl units.

The Photoactivable Catalyst Component (Iv)

Component (iv), the photoactivatable catalyst, preferably contains at least one metal selected from the group composed of Pt, Pd, Rh, Co, Ni, Ir or Ru. The photoactivatable catalyst preferably comprises platinum.

Component (iv) is preferably an organometallic compound, i.e., comprises carbon-containing ligands, or salts thereof. In a preferred embodiment component (iv) has metal carbon bonds, including sigma- and pi-bonds. Preferably the photoactivatable catalyst is an organometallic complex compound having at least one metal carbon sigma bond, still more preferably a platinum complex compound having preferably one or more sigma-bonded alkyl and/or aryl group, preferably alkyl group(s). Sigma-bonded ligands include in particular, sigma-bonded alkyl groups, preferably sigma-bonded $C_1$ to $C_6$-alkyl, more preferably sigma-bonded methyl groups, sigma-bonded aryl groups, like phenyl, sigma-bonded silyl groups, like trialkyl silyl groups. Most preferred photoactivatable catalyst include $\eta^5$-(optionally substituted)-cyclopentadienyl platinum complex compounds having sigma-bonded ligands, preferably sigma-bonded alkyl ligands.

The photoactivatable catalyst can be used as such or with a carrier. Carriers that can be used for the catalysts are any solid substances, which do not inhibit curing undesirably, or reduce transparency for photoactivation undesirably. The carrier can be solid or liquid. Solid carriers include for example silica, alumina, organic resins etc. Liquid carriers include polyorganosiloxanes, polyethers, solvents etc.

The photo-activatable catalyst is a catalyst, which provides sufficient pot life, i.e. processing time prior to gelling of the abovementioned components, once these have been combined.

Examples of photo-activatable catalysts include η-diolefin-α-aryl-platinum complexes, such as disclosed in U.S. Pat. No. 4,530,879, EP 122008, EP 146307 (corresponding to U.S. Pat. No. 4,510,094 and the prior art documents cited therein), or US 2003-0199603, and also platinum compounds whose reactivity can be controlled by way for example using azodicarboxylic esters, as disclosed in U.S. Pat. No. 4,640,939 or diketonates.

Photoactivatable platinum compounds that can be used are moreover those selected from the group having ligands selected from diketones, e.g. benzoylacetones or acetylenedicarboxylic esters, and platinum catalysts embedded into photo-degradable organic resins. Other Pt catalysts are mentioned by way of example in U.S. Pat. No. 3,715,334 or U.S. Pat. No. 3,419,593, EP 1 672 031 A1 and Lewis, Colborn, Grade, Bryant, Sumpter, and Scott in Organometallics, 1995, 14, 2202-2213, all incorporated by reference here.

Photo-activatable catalysts can also be formed in-situ in the silicone composition to be shaped, by using $Pt^0$-olefin complexes and adding appropriate photo-activatable ligands thereto.

$Pt^0$-olefin complexes are prepared by way of example in the presence of 1,3-divinyltetramethyldisiloxane ($M''_2$) via reduction of hexachloroplatinic acid or of other platinum chlorides.

The photo-activatable catalysts that can be used here are, however, not restricted to these above mentioned examples.

Particularly preferred catalysts in view of high reactivity and cure rate include:

($\eta^5$-cyclopentadienyl)-trialkyl-platinum complexes with (Cp=cyclopentadienyl) such as
(Cp)trimethylplatinum
(Cp)ethyldimethylplatinum
(Cp)triethylplatinum
(Cp)triallylplatinum
(Cp)tripentylplatinum
(Cp)trihexylplatinum
(methyl-Cp)trimethylplatinum
(trimethylsilyl-Cp)trimethylplatinum
(phenyldimethylsilyl-Cp)trimethylplatinum
(Cp)acetyldimethylplatinum
(Cp)diethylmethylplatinum
(Cp)triisopropylplatinum
(Cp)tri(2-butyl)platinum
(Cp)triallylplatinum
(Cp)trinonylplatinum
(Cp)tridodecylplatinum
(Cp)tricyclopentylplatinum
(Cp)tricyclohexylplatinum
(chloro-Cp)trimethylplatinum
(fluoro-Cp)trimethylplatinum
(Cp)dimethylbenzylplatinum
(triethylsilyl-Cp)trimethylplatinum
(dimethylphenylsilyl-Cp)trimethylplatinum
(methyldiphenylsilyl-Cp)trimethylplatinum
(triphenylsilyl-Cp)trihexylplatinum
[1,3-bis(trimethylsilyl)-Cp]trimethylplatinum
(dimethyloctadecylsilyl-Cp)trimethylplatinum
1,3-bis[(Cp)trimethylplatinum]tetramethyldisiloxane
1,3-bis[(Cp)trimethylplatinum]dimethyldiphenyldisiloxane
1,3-bis[(Cp)dimethylphenylplatinum]tetramethyldisiloxane
1,3,5-tris[(Cp)trimethylplatinum]pentamethyltrisiloxane
1,3,5,7-tetra[(Cp)trimethylplatinum]heptamethyltetrasiloxane
(methoxy-Cp)trimethylplatinum
(ethoxymethyl-Cp)ethyldimethylplatinum
(methyoxycarbonyl-Cp)trimethylplatinum
(1,3-dimethyl-Cp)trimethylplatinum
(methyl-Cp)triisopropylplatinum
(1,3-diacetyl-Cp)diethylmethylplatinum
(1,2,3,4,5-pentachloro-Cp)trimethylplatinum
(phenyl-Cp)trimethylplatinum
(Cp)acetyldimethylplatinum
(Cp)propionyldimethylplatinum
(Cp)acryloyldimethylplatinum
(Cp)di(methacryloyl)ethylplatinum
(Cp)dodecanoyldimethylplatinum
trimethylplatinumcyclopentadienyl-terminated polysiloxane.

The most preferred photoactivatable catalysts to be used in the process of the invention are optionally alkyl or trialkylsilyl substituted cyclopentadienyl-tris-alkyl-platinum compounds, in particular, alkylcyclopentadienyl-trimethyl-platinum, in particular, methylcyclopentadienyl-trimethylplatinum.

Further photoactivatable catalysts include (η-diolefin)-(sigma-aryl)-platinum complexes (see e.g. U.S. Pat. No. 4,530,879) as exemplified in the following (wherein for the sake of simplification, "COD" signifies cyclooctadiene, "COT" signifies cyclooctatetraene, and "NBD" signifies norbornadiene):
(1,5-COD)diphenylplatinum
(1,3,5,7-COT)diphenylplatinum
(2,5-NBD)diphenylplatinum
(3a,4,7,7a-tetrahydro-4,7-methanoindene)diphenylplatinum
(1,5-COD)-bis(4-methylphenyl)platinum
(1,5-COD)-bis(2-methylphenyl)platinum
(1,5-COD)-bis(2-methoxyphenyl)platinum
(1,5-COD)-bis(3-methoxyphenyl)platinum
(1,5-COD)-bis(4-phenoxyphenyl)platinum
(1,5-COD)-bis(4-methylthiophenyl)platinum
(1,5-COD)-bis(3-chlorophenyl)platinum
(1,5-COD)-bis(4-fluorophenyl)platinum
(1,5-COD)-bis(4-bromophenyl)platinum
(1,5-COD)-bis(4-trifluoromethylphenyl)platinum
(1,5-COD)-bis(3-trifluoromethylphenyl)platinum
(1,5-COD)-bis(2,4-bis(trifluoromethyl)phenyl)platinum
(1,5-COD)-bis(4-dimethylaminophenyl)platinum
(1,5-COD)-bis(4-acetylphenyl)platinum
(1,5-COD)-bis(trimethylsilyloxyphenyl)platinum
(1,5-COD)-bis(trimethylsilylphenyl)platinum
(1,5-COD)-bis(pentafluorophenyl)platinum
(1,5-COD)-bis(4-benzylphenyl)platinum
(1,5-COD)-bis(1-naphthyl)platinum
(1,5-COD)-naphthylphenylplatinum
(1,5-COD)-bis(2H-chromen-2-yl)platinum
(1,5-COD)-bis(xanthen-1-phenyl)platinum
(1,3,5-cycloheptatriene)diphenylplatinum
(1-chloro-1,5-COD)diphenylplatinum
(1,5-dichloro-1,5-COD)diphenylplatinum
(1-fluoro-1,3,5,7-COT)diphenylplatinum
(1,2,4,7-tetramethyl-1,3,5,7-COT)-bis(4-methylphenyl)platinum
(7-chloro-2,5-NBD)diphenylplatinum
(1,3-cyclohexadiene)diphenylplatinum
(1,4-cyclohexadiene)diphenylplatinum
(2,4-hexadiene)diphenylplatinum
(2,5-heptadiene)diphenylplatinum
(1,3-dodecadiene)diphenylplatinum bis[η²-2-(2-propenyl)phenyl]platinum
bis[η²-2-(ethenylphenyl)platinum
bis[η²-2-(cyclohexen-1-ylmethyl)phenyl]platinum.

Further photoactivatable catalysts include (η-diolefin)(sigma-alkyl)-platinum complexes, like
(1,5-COD)Pt(methyl)$_2$
(1,5-COD)Pt(benzyl)$_2$
(1,5-COD)Pt(hexyl)$_2$.

The amount of component (iv) is preferably 0.1-1000 ppm, preferably 0.5-500 ppm, more preferably 1-100 ppm, particularly preferably 2-50 ppm, most preferably 2 to 20 ppm calculated as metal, based on the weight of components (i) to (iii).

The curing rate is inter alia determined by the selected catalyst compound, by its amount, and also by the nature and amount of an optionally present additional inhibitor component covered by components (vi).

Component (v) Filler

The silicone mixtures to be shaped and cured used according to the process of the invention moreover optionally comprise one or more, if appropriate surface-modified, fillers (v).

In general, if such fillers inhibited the photoactivation of the photoactivatable catalyst (iv), in particular due to their non-transparency or low light-transmittance, the process of the present invention would require that such fillers, if intended to be in the final shaped article, are admixed after the photoactivation or irradiation step as described below.

The fillers include by way of example all of the fine-particle fillers, i.e. those having particles smaller than 100 μm, i.e. preferably composed of such particles. These can be mineral fillers, such as silicates, carbonates, nitrides, oxides, carbon blacks, or silicas. The fillers are preferably those known as reinforcing silicas, which permit production of opaque elastomers having better transparency, i.e. those which improve vulcanizate properties after crosslinking, and increase strength, examples being fumed or precipitated silica whose BET surface areas are from 50 to 400 m²/g, these preferably having been specifically surface-hydrophobicized here. If component (v) is used, its amounts are from 1 to 100 parts by weight, preferably from 10 to 70 parts by weight, even more preferably from 10 to 50 parts by weight, based on 100 parts by weight of component (i) and optionally (ii).

Fillers whose BET surface areas are above 50 m²/g permit production of silicone elastomers with improved vulcanizate properties. It is only above 90 m²/g that vulcanizate strength and transparency increase with, for example, fumed silicas, and these are therefore preferred, and even more preferred silicas are, for example, Aerosil® 200, 300, HDK® N20 or T30, Cab-O-Sil® MS 7 or HS 5 more than 200 m²/g BET surface area. As BET surface area rises, the transparency of the silicone mixtures in which these materials are present also rises. Examples of trade names of the materials known as precipitated silicas, or wet silicas, are Vulkasil®VN3, or FK 160 from Degussa, or Nipsil®LP from Nippon Silica K.K. and others.

It is preferred to use silica fillers having surface areas above 50 m²/g leading to compositions in which the catalyst (v) can be photoactivated due to sufficient transparency.

Examples of materials serving as non-transparent fillers known as non-reinforcing fillers are powdered quartz, diatomaceous earths, powdered crystoballites, micas, aluminum oxides, aluminum hydroxides, Ti oxides, Fe oxides, Zn oxides, chalks, or carbon blacks whose BET surface areas are from 0.2 to 50 m²/g or higher if carbon black is used. These fillers are available under variety of trade names, examples being Sicron®, Min-U-Sil®, Dicalite®, Crystallite®. The materials known as inert fillers or extenders with BET surface areas below 50 m²/g should advantageously comprise no particles (<0.005% by weight) above 100 μm for use in silicone rubbers, in order that further processing generates no problems during downstream processing, e.g. passage through sieves or nozzles, or the mechanical properties of the articles produced therefrom are adversely affected.

Among the opacifying fillers are also in particular non-transparent, in particular inorganic, pigments or carbon black.

The use of these opacifying fillers is preferred only when pigmentation is necessary or the physical function like thermal or electrical conductivity is a requirement.

The use of opaque non-transparent fillers requires changing the usual sequence of the activation and shaping steps in the process. Normally, if no or transparent fillers are used, the photoactivation through irradiation is carried out after the final shaping process. If opaque non-transparent fillers, which would inhibit the photoactivation of the photoactivatable catalyst, are used, the photoactivation step is carried out before the opaque non-transparent fillers are incorporated and the mixture is shaped.

As the person skilled in the art knows, a filler can also be a pigment. For clarification, the intention is that all of the inorganic pigments included in the term filler as component (v) for the present invention, whereas all of the remaining pigments and dyes, in particular organic dyes and stabilizers, be included in the definition of the auxiliaries (vi).

The fillers (v) may be subject of any suitable conventional surface-treatment with suitable surface-treatment agents (belonging to components (vi), such as hydrophobizing treatment with suitable hydrophobizing agent, dispersing treatment with suitable dispersing agents which influence the interaction of the filler with the silicone polymer, e.g. influence thickening action. The surface treatment of the fillers is preferably hydrophobation with silanes or with siloxanes. It can by way of example take place in situ via addition of silazanes, such as hexamethyldisilazane and/or 1,3-divinyltetramethyldisilazane, with addition of water, and in-situ hydrophobation is preferred. It can also take place with other familiar filler-treatment agents, for example with vinylalkoxysilanes, e.g. with vinyltrimethoxysilane, or with other silanes having unsaturated organofunctional groups, for example with methacryloxypropyltrialkoxysilanes, or else with polyorganosiloxanediols whose chain lengths are from 2 to 50 and which bear unsaturated organic radicals, with the aim of providing reactive sites for the crosslinking reaction. As explained above, however, for the purpose of the present invention the alkenyl-substituted polyorganosiloxanes used as hydrophobizing agent will be also subsumed under component (ii).

In order to establish examples of commercially available silicas pre-hydrophobized with various silanes are: Aerosil R 972, R 974, R 976, or R 812, or, for example, HDK 2000 or H30 Examples of trade names for materials known as hydrophobized precipitated silicas or wet silicas are Sipernat D10 or D15 from Degussa.

These pre-hydrophobized silicas are less preferred than the silicas hydrophobized in-situ with silazanes. Vulcanizate properties and rheological properties, i.e. technical processing properties, of the silicone rubber mixtures can be influenced by the selection the amount of the type of the filler, its amount, and the nature of hydrophobation.

In one preferred embodiment, the silicone composition to be shaped according to the process of the invention comprises at least one reinforcing filler (v) which has at least a BET surface area of more than 50 m²/g, preferably more than 80 m²/g of BET surface area.

According to the invention, it is also possible to use a mixture of one or more, in particular two, fillers with different specific surface areas. Suitable selection of different, in particular two, fillers with different specific surface areas or treatment processes in order support the requirements of good extrusion properties, i.e. namely retaining high flowability at high level of green strength of unhardened polymer compositions and avoiding self-leveling of the continuously shaped articles. This can be achieved best by using fillers having preferably surface areas above 90 m$^2$/g BET and a surface treatment with polyorganosiloxanediols, polyorganosiloxanes, chloro or alkoxysilanes which ensure a high degree of thickening properties, high viscosity level and shear thinning. Another assumption is a sufficient polymer viscosity. In addition one can increase the performance for effective extrusion by using specific auxiliary additives such as PTFE powders, PTFE emulsions or boron derivative in smaller amounts i.e. below 1 wt. %.

Component (vi): Conventional Additives

The auxiliary or conventional additives can comprise for example organic dyes or pigments if not already defined under (v), stabilizers introduced in silicone rubbers in order to improve heat stability i.e. resistance against hot air, reversion, such as i.e. depolymerisation under attack of traces of acids or water at high temperature. The auxiliary or conventional additives further include e.g. plasticizers, or release oils, or hydrophobicizing oils, such as polydimethylsiloxane oils, without reactive alkenyl or SiH groups, with viscosity which is preferably 0.001-10 Pa·s at 25° C. Additional mold-release or flow improving agents can also be used, examples being fatty acid derivatives or fatty alcohol derivatives, fluoroalkyl surfactants. Compounds advantageously used here are those which separate rapidly and migrate to the surfaces. Stability after exposure to hot air can by way of example be increased using known hot-air stabilizers, such as Fe-, Mn-, Ti-, Ce- or La-compounds, and organic salts of these, preferably their organic complexes. Another class of the conventional additives (vi) are additives which can improve rheological properties, to provide higher flow and smooth surfaces of the shaped articles. Such additives are known for the persons skilled in the art and include PTFE-powders, boron oxide derivatives, flow additives like fatty acid derivative, esters and its salts or fluoroalkyl surfactants. The auxiliary additives (vi) may also include so-called inhibitors for controlling the crosslinking reaction. However the presence of those inhibitors is in general not preferred. However, if it is intended to extent the pot life of the silicone composition to be shaped, for example, in case non-transparent fillers are to be compounded after photoactivation, the use of such inhibitors may be suitable to decrease the cure rate. Examples of advantageous inhibitors include for example vinylsiloxanes, 1,3-divinyltetramethyldisiloxane, or tetravinyl-tetramethyl-tetracyclosiloxanes (for sake of clarity it is pointed out that if inhibitors belong to the class of alkenyl polyorganosiloxanes they are formally subsumed under component (i) or (ii)). It is also possible to use other known inhibitors, for example ethynylcyclohexanol, 3-methylbutynol, or dimethyl maleate.

The mixture to be shaped, in particular, to be extruded comprising the components (i), (iii) and (iv) and optionally (ii), (v) and (vi), preferably has a viscosity of at least of 10 Mooney units. If the viscosity of the shaping or extrusion mixture is less than a certain viscosity, extrusion rate might be too low, because the extrusion pressure might be too low, and also the so-called "green-strength" of the extrudates leaving the extruder before curing might be too low, so that in particular it might be impossible to pull the extrudates through the extrusion line downstream. Preferably the viscosity of the shaping mixture is at least 10 Mooney units, more preferably at least 15 Mooney units at room temperature (25° C.). Mooney will be measure accordingly to DIN 53523 at 25° C. as so-called $MI_0$ (starting value at time 0+15 sec/max after 0 sec and $MI_4$=value 4 min after $MI_0$.

Shaping Process

The shaping apparatus used in the process of the invention, preferably comprises at least one shape forming die, through which the mixture to be shaped is passed, with the formation of the continuously formed silicone article. Preferably the continuous shaping step is an extrusion step and the shaping apparatus is an extruder. The extruder is preferably selected from single-screw extruders, twin-screw extruders and gear extruders, with the single-screw extruders and gear extruders being the most preferred extruders. It may be also possible to use other shaping apparatus than extruders with a die to prepare the endless shaped article, like shaping rollers, but those are less preferred.

One of the major advantages of the process according to the present invention is that the composition cures by irradiation. Therefore,—in contrast to thermally curing systems, like peroxide- or metal catalyst initiated systems—it is normally not necessary to cool the extruder in order to prevent curing of the mixture to be cured in the extruder. Therefore, the continuous light-induced shaping process according to the invention is quite favorable in terms of energy saving and operation costs, including costs for extrusion equipment.

In the process according to the present invention the irradiation step b) is carried out preferably with light of a wavelength in the range from 190 to 600 nm. Usually a non-laser light source emits a spectrum of wavelengths, and according to the present invention preferably the maximum of the light emitted lies in the range of 190 to 600 nm, more preferably in the range of 200 to 460 nm.

In the process according to the invention an optional heat treatment step (c) may be performed after initiation of the curing process through irradiation, in order to accelerate curing. Such optional heat treatment step (c) may be carried out by passing an oven, having a temperature of for example 50° C. to 250° C. and at an extrudate surface temperature of 20° to 200° C., more preferred 35-150° C., still more preferred 40 to 90° C. In general, however, thermal stress of the extrudates prepared in accordance with the process of the present invention is much lower than of extrudates subjected to thermal curing, resulting in an improved surface, i.e. reduced embrittlement, reduced reversion and reduced thermal shrinkage.

Accordingly the present invention also relates to the shaped light-cured silicone extrudates, obtained by the process of the invention.

Such shaped light-cured silicone extrudates for example have the form of a sheet, a tube, a cable, insulation on wire, a cable jacket, an insulation or sheathing of temperature sensitive other substrate, a profile, particularly embracing a carrier substrate made of plastic or natural polymers, or a sheathing of cable or tubes etc.

The present process of the invention is particularly suitable for the manufacture of shaped co-extrudates, in particular, co-extrudates with thermally sensitive substrates, like thermoplastics, rubbers, leather, natural polymers, like cellulose, collagen, wood, low-melting metals, comprising the light-cured silicone extrudates, obtained by the process of the invention in association with at least one further extruded material. Such shaped co-extrudates may have the forms of strands, tubes, profiles for sealing in all forms and dimensions, insulations, seals, sheathings etc.

The present invention further is related to the use of at least one polyorgano-siloxane having at least three alkenyl groups and an average number of diorganosiloxy units determined by GPC with polystyrene as standard of at least 3000, and having a content of vicinal alkenyl groups of less than 0.025 mol. %, preferably less than 0.005 mol-% determined by $^{29}$Si-NMR spectroscopy or calculation as described above for the manufacture of continuously formed shaped articles.

The present invention further is related to a novel composition, comprising:
(i) at least one polyorganosiloxane having at least three alkenyl groups and an average number of diorganosiloxy units determined by GPC with polystyrene as standard of at least 3000, and having in average less than 0.025 mol-% vicinal alkenyl groups, preferably less than 0.005 mol. %, the mol-% being based on integral of the $^{29}$Si-NMR signal at −34.89 to. −35.47 ppm related to the integral of the signals for all vinyl substituted Si atoms ($P^{vinyl\ tot}$=total concentration of Si vinyl atoms as described above),
(ii) optionally one or more polyorganosiloxanes having alkenyl groups, other than the polyorganosiloxane according to the component (i),
(iii) at least one polyorganosiloxane having at least two SiH groups,
(iv) at least one photoactivatable transition metal catalyst,
(v) optionally one or more filler,
(vi) optionally one or more conventional additives,
which can be used, in particular, for the manufacture of continuously formed shaped articles.

Preferably such composition comprises the components (i) to (vi) in the amounts of components (i) to (vi) in the following amounts:
(i) 100 parts by weight,
(ii) 0 to 100 parts by weight, preferably 0 to 30 parts by weight,
(iii) 0.1 to 30 parts by weight, preferably 1 to 10 parts by weight,
(iv) 1 to 100 ppm, preferably 2 to 20 ppm, (referring to the amount of the transition metal in the photoactivatable transition metal catalyst in relation to the total amount of components (i) to (iii)),
(v) 0 to 100 parts by weight, preferably 15 to 60 parts by weight,
(vi) 0 to 15 parts by weight, preferably 0.01 to 10 parts by weight.
which can be used for the manufacture of continuously formed shaped articles.

The shaped light-cured silicone extrudates according to the invention can be used preferably in food and beverage industry, in medical care applications, in the electro and electronic industry, as glass fiber isolation, elastomer seal for or upon temperature sensitive substrates, etc.

The present invention also relates to an extrusion line, comprising:
a) at least one extrusion means,
b) at least one irradiation means,
c) optionally at least one heating means,
d) optionally at least one conveying means, and
e) at least one packaging means,
which can be used, in particular, to prepare the shaped light-cured silicone extrudates according to the invention.

The extrusion line as mentioned before may have additional mixing means, where the extrusion mixture is prepared. Such mixing means may include for example a kneader, two roll-mixers, mixing extruder, in particular twin screw extruders, a LIST-mixer, ZSK-extruders, HENSCHEL-mixers, BANBURY-mixers, BUSS-co-kneader (oscillating one screw mixer).

Preferably a two-step mixing process is used, wherein in a first step an extrusion mixture is prepared with the components without the photoactivatable transition metal catalyst, and in a second mixing step the photoactivatable transition metal catalyst optionally together with other components is incorporated to prepare the photoactivatable extrusion mixture. During the incorporation of the photoactivatable transition metal catalyst and after the photoactivatable extrusion mixture is prepared, care must be taken for preventing premature cross-linking, which would make the subsequent extrusion difficult or even impossible. Premature cross-linking of the photoactivatable extrusion mixture can be prevented for example by using closed apparatuses, or depending on the specific catalyst used, light of selected wavelength ranges, e.g. yellow light (600 to 650 nm) or red light (650 to 1000 nm). If light of selected wavelength ranges, which do not activate the photoactivatable transition metal catalyst, is used, of course open apparatuses can be used, like two-roll mixers, etc.

The specific kind of extrusion line is also depending on the pigments or fillers used. If those pigments or fillers are opaque (that is light-proof), then the photoactivation cannot be carried out anymore after such opaque fillers or pigments are added. In such case it is necessary to first photoactivate the mixture, and thereafter mixing the mixture with such opaque fillers or pigments. In such case it is preferred that the average residence time of the extrusion mixture between the activation step and the final shaping step when passing the extruder die is smaller than the scorch time ($MI_{min+5}$ i.e. the time wherein the Mooney viscosity increases of more than 5 units above the minimum), because otherwise the final shaping step becomes difficult or even impossible.

In this respect it has to be emphasized that in the present invention the enumeration of the process steps a) to e) does not necessarily determine the order of carrying out such steps. As explained before, in accordance with the present invention it is also possible to carry out the irradiation step before the final shaping, preferably extrusion step, if the use of opaque fillers or pigments requires so.

In a preferred embodiment of the process of the invention however, translucent mixtures are prepared, where the irradiation step is carried out after the final shaping, preferably extrusion step. That is, such process usually includes a first step of mixing the mixture to be extruded, which may preferably include a separate step of admixture of the photoactivatable catalyst. In the second step the mixture obtained is fed into shape-forming extruder. It is also in the scope of the invention to carry out a mixing step for the components of the mixture to be shaped directly in the shape-forming apparatus, preferably in the extruder. Such extruders have means to introduce the several components. It lies also in the ambit of the present invention to perform the mixing of all components of the mixture except for the photoactivatable catalyst in a conventional mixing unit such as a kneader, and to incorporate the photoactivatable catalyst in the shape-forming apparatus, preferably the extruder, which has means for introducing additional components into the mixture to be extruded.

After the mixture has been formed it is discharged from the shaping apparatus and than passed on with suitable conveying means to an irradiation stage, wherein irradiation is carried out in order to activate the photoactivatable catalyst and to initiate the curing of the shaped silicone composition. Usually a heating step after the irradiation step is not required in order to complete curing, since the mixture is cured by the action of the photoactivated catalyst, but a heating step can be used additionally to shorten the curing time, if desired. Normally, the silicone composition formed according to the process of the invention does require higher temperatures during its manufacture, which is a particular advantage of the process of the invention, because it is energy saving, because it neither requires heating nor cooling means, and moreover, thermal shrinking of the shaped silicone composition can be almost completely avoided.

On the other hand, it is according to the invention normally not necessary to cool the shape-forming apparatus, in particular, the extruder, because the composition is not thermally sensitive, i.e. does not cure, before photoactivation of the catalyst through irradiation has been initiated. In particular on an industrial scale it represents a great advantage that the process of the present invention does not require cooling of the shape forming apparatus. However, in the specific case, where opaque fillers or pigments are used to prepare the shaped silicone articles with the process of the present invention, which requires an additional mixing step and the subsequent forming step after the irradiation step to activate the catalyst is carried out, it might be necessary to have the activated mixture cooled after the irradiation step to increase the scorch time of the mixture.

As the shape-forming apparatuses in the present invention there can be used for example extruders, shaping rolls, etc.

The extruders that can be used as shape-forming apparatuses in the present invention include in particular single-screw extruders, twin screw extruders and gear extruders, having suitably integrated dies for shaping, in particular, the extruder according to WO 03/024691, because such extruders can unify mixing and extruding with one srew. The extruders include extruders feeding a crosshead for shaping sheathings or insulations. Extruders useable in the present invention may have the following throughput: 0.01 to 5000 kg/hour of the silicone composition. The preferred dimension is designed for an output of 1 to 500 kg/h. The extrusion rate therefore can run up to 600 m/min or more if the length of the channel for irradiation can provide exposure times for round about 1 sec or more. Thick-walled tubes or profiles are preferably extruded between 1-20 m/min. Higher extrusions rates can be applied purposively for e.g. wire insulations.

Single screw extruders and gear (pump) extruders useable in the present invention may have the following typically (length-to-diameter) L/D-ratio of 10:1 to 25:1. Screw diameters may be between 10 and 150 mm, preferably 30 to 90 mm, screw length may be between 5 to 1000 mm. The screw rotation (number of revolutions/min) may be 10 to 150 RPM. The screw should have a compression rate of 1:1.1 to 1:3 which can be obtained with constant core diameter and varying flight distance or with varying core diameter and constant flight distance.

For trouble free continuous feeding and high output, the flight should be quite deep and should be hardened or hard metal coated to prevent wear. In the process of the invention it is not necessary to cool the composition to prevent scorch due to the shear heat generated during the extrusion process as explained above. The twin-screw extruders may have co-rotating or counter-rotating screws of the same dimension as the single screw extruders. They are however less preferred in the process of the invention except as mixing unit in the mixing step as explained above.

The shape-forming apparatuses, in particular, the extruders used in the process of the invention can be operated in vertical units, wherein the formed composition is dropped downwards by its own weight or pulled upwards by a motor-driven drum at the top. Horizontal shape forming apparatuses, in particular, extruders are preferably used in the process of the invention. Such kind of operation usually requires the use of a conveyor belt.

In accordance with the invention it also possible to prepare co-extrudates, where the silicone composition is attached to any kind of other material, including thermoplastic substrates (which can be processed particularly advantageous with the process of the invention, because the process does not require thermal curing), like polyethylene, polypropylene, polyvinylacetate, natural biodegradable polymers, like polylactic acid, polycarbonate, foam plastic articles, like foam extrudates, like endless foam profiles.

The process offer a method for the manufacture of seals for plastic boxes wherein the shaped extrudate is placed immediately after the shaping process.

As the irradiation means in the process of the present invention and in the extrusion line of the present, invention conventional irradiation units providing light whose wavelength is in the range of preferably from 180 to 600 nm, more preferably 190-500 nm, are used. If the light-activatable curable compositions comprise appropriate sensitizers or photoinitiators, selected from the class of anthracene, xanthonone, anthraquinone derivatives, then irradiation sources providing light of a wavelength range of 180 to 700 nm can also be used. The addition of commercially available sensitizers, such as benzophenones, etc., permits activation using longer-wavelength light or with better yields of light. As the irradiation sources preferably UV radiation sources are used for light-activation selected from xenon lamps which can be operated as flash lamps, undoped or iron- or gallium-doped mercury lamps, black-light lamps, excimer lasers and LEDs. The light-irradiation intensity (radiation dose*exposure time per unit of volume) is selected as a function of the selected process, of the selected composition of the temperature of the composition in such a way as to give a sufficient processing time. Commercially available irradiation sources may be used in the irradiation step of the present invention. Such irradiation sources may have power consumption of 0.5 to 20 kW and length of irradiation units of 5 cm to 1 m, which may be arranged in series of more than one irradiation unit to achieve increased exposure time. Additional reflectors radial assembled can help to increase the yield of light. The distance between shaped extrudate and light source is preferred between 1 cm to 100 cm.

Average exposure times (time which is required to pass the irradiation unit(s)) is for example at least 1 second, preferably 2 to 50 seconds.

Optionally useable additional heating means arranged after the irradiation unit may include conventional ones, i.e. hot air chambers, strip heaters, heat radiator units, heating mantles, etc.

Optionally the process is carried out with at least one conveying means, at least one packaging means and/or cutting means, for cutting the endless extrudates into pieces.

The endless extrudate is conveyed by for example conveyor belts and finally it is cutted, and/or wound and/or packed to obtain the final shaped light-cured silicone article.

The present invention still further provides a continuous extrusion process for the manufacture of cured silicone extrudates, comprising:
  mixing the following components:
  (i) at least one linear polyorganosiloxane having at least three alkenyl groups and an average number of diorganosiloxy units determined by GPC with polystyrene as standard of at least 3000, (ii) optionally one or more polyorganosiloxane having alkenyl groups, other than the polyorganosiloxane according to the component (i),
(iii) at least one polyorganosiloxane having at least two SiH groups,
(iv) at least one photoactivatable transition metal catalyst,
(v) optionally one or more filler,
(vi) optionally one or more conventional additives,
feeding said mixture obtained into an extruder,
extruding said mixture through a die to obtain a continuously formed extrudate,
conveying said extrudate obtained to an irradiation stage,
irradiating said extrudate with light of a wavelength in the range from 190 to 600 nm to obtain a continuously formed, cured silicone extrudate,
collecting said continuously formed, cured silicone extrudate, and
optionally cutting said continuously formed, cured silicone extrudate.

EXAMPLES

Example 1

Example according to the invention 75 parts per wt. of a polydimethylsiloxane having 0.03 mol-% terminal vinyldimethylsiloxy units and 0.2 mol-% pendant vinylmethylsiloxy units with a viscosity of $20*10^3$ Pa·s at 25° C. ($P_n$ 8000), 25 parts per wt. of a polydimethylsiloxane having 0.03 mol-% terminal vinyldimethylsiloxy units and 0.08 mol-% pendant vinylmethylsiloxy units with a viscosity of $20*10^3$ Pa·s at 25° C. ($P_n$ 8000) as components (i), 36 parts per wt. of a fumed silica treated with 6 wt.-% octamethylcyclotetrasiloxane and a BET surface of ca. 200 m$^2$/g as component (v), 1 part per wt. of an α,ω-polydimethylsiloxanediol having an OH-content of 6.5 wt. %, 0.15 parts per wt. of tetramethyldivinyldisilazane, 1 part per wt. of an α,ω-dimethoxypolydimethyl-siloxane having a methoxy content of 7 wt.-% (all three as component (vi)) are admixed at 110° C. in a two-blade-kneader for 90 minutes and the volatiles evaporated for 2 hours at 180-190° C. in a vacuum of 20 mbar.

After subsequently cooling down to 65° C. the mixture for 15 minutes 0.85 parts per wt. of a trimethylsiloxy-endstopped polyhydrogenmethyl-dimethylsiloxane having a SiH-content of 8.9 mmol/g and a viscosity of 45 mPa·s as component (iii) are mixed to the previous composition. This mixture is admixed for 10 minutes in the dark or presence of filtered light ('yellow light') with $\eta^5$-methylcyclopentadienyl)-trimethyl-platinum related to 4 ppm platinum metal as component (iv) as metal related to the components (i) to (iii).

The complete composition therefore has 0.20 mol. % Mvi and Dvi groups and a calculated content of vicinal vinyl groups of 0.00043 mol. % in the components (i) and (iii).

The mixture including the catalyst then was photoactivated, extruded with a single screw extruder Rheomex combined with Rheocord EU 3 Fa. Haake (screw diameter 19 mm, L/D=14), 24 RPM (revolutions/min) and cured under following conditions:

The shaped extrudate passed a UV-lamp iron doped having a bulb length of 10 cm and an power of 2.4 kW with an extrusion rate of 1.5 m/min.

The shaped article is a tube having a diameter outside of 5 mm and inside of 3 mm. A continuous strand as the extruded article was collected about 1 m after the irradiation channel. The transparent elastomeric extrusion tube was almost completely cured and could be wound up and stored without any problems.

The hardness according to DIN 53501 of the extrusion strand was nearly exactly the same as the hardness of a 6 mm test sheet made by exposure to 60 sec UV-light and 12 h after exposure to daylight at 25° C. from the same composition. A hardness of 46° Shore A was measured for 3×2 mm sheets of the tube.

The extrusion rate can be increased up to 6.1 m/min, upon which the extrusion strand is still crosslinked enough to prevent deformation of the shaped extrudate and to allow winding-up the tube. During subsequent storage at room temperature the strand gets cured completely after a few minutes. This shows that irradiation in the process of the present invention basically is required only for the initiation of the cross-linking process, which in turn allows high extrusion rates, which is a major advantage in the industrial production of silicone elastomers. A further increase of the extrusion rate can be achieved by increasing the irradiation power and/or the length of the irradiation unit.

The silicone composition of example 1 are formed into sheets of 2-6.4 mm thickness which are irradiated under the same UV-lamp at different irradiation times, in order to determine reasonable irradiation times for continuous extrusion at certain thicknesses of the extrusion articles. Table 1 shows the physical properties of the cured sheets:

TABLE 1

| Thickness [mm] | Irradiation time [s] | Hardness [° Shore A] |
| --- | --- | --- |
| 3.2 | 1 | <30 |
| 3.2 | 3 | 46 |
| 6.4 | 5 | 38 |

Table 1 shows that required irradiation time does not depend strongly on the thickness of the articles to be extruded.

Example 2

100 parts per weight of a polydimethylsiloxane having 0.03 mol. % terminal vinyl-dimethylsiloxy units and 0.42 mol-% vinylmethylsiloxy units i.e. 0.45 mol. % (0.0609 mmol/g) for all vinyl groups and a viscosity of $11*10^3$ Pa·s at 25° C. ($P_n$=6500) as component (i). The composition further comprises 45 parts per weight of a fumed silica having a BET-surface of ca. 200 m$^2$/g as component (v), 6.5 parts per weight of an α,ω-dihydroxydimethylsiloxane having a content of OH-groups of 7.5 wt.-% as component (vi) and 0.5 parts per weight of hexamethyldisilazane as component (vi).

All components (i), (v) and (vi) are admixed in a kneader at 120° C. for 90 minutes and then for additional 120 min at 160° C. the volatiles were evaporated and externally condensed.

After cooling down to 65° C. the composition was admixed together with 1 part per weight of a trimethylsiloxy-terminated polyhydrogenmethyl-dimethylsiloxane having a content of SiH-groups of 7.4 mmol/g and a viscosity of 40 mPa·s for 15 minutes.

The aforementioned composition is admixed for 10 minutes under exclusion of light or under 'yellow' light with $\eta^5$-(methylcyclopentadienyl)-trimethyl-platinum according to 4 ppm platinum calculated as metal related to the components (i) to (iii).

The total amount of the vinyl, units in the composition was 0.45 mol. % and the total amount of the vicinal Si-vinyl groups are calculated to be 0.0020 mol. % in the components (i) and (iii).

The tube having the dimension an outer diameter 5 mm and an inner diameter 3 mm could be extruded with an extrusion rate of 1.7 m/min at 24 RPM. The Mooney viscosity was measured to be $MI_0/MI_4$=34/32 units. If photoactivation or the catalyst (iv) is omitted, then the uncured tube maintained its shape over more than 1 min after the shaping process through the die.

The composition could be extruded under the same conditions as those used in example 1. A continuously shaped strand as the extruded article could be collected about 1 m after the irradiation channel. The transparent elastomeric extruded tube could be almost completely cured and could be wound up and stored without any problems.

In addition a shaped test sheet of this composition having a thickness of 2 mm was exposed for 5 and 10 sec. to the irradiation of a iron doped UV-lamp having a length of 10 cm and a power of 2 kW with a distance to the sheet of 4 cm.

A hardness of 20° and 22° Shore A was measured on a sheet of 3×2 mm, for each 2 mm sheet the hardness was 33°/35°, which shows that the composition can be cured after a irradiation time reasonable for an extrusion operation.

Example 3

100 parts per weight of a polydimethylsiloxane having 0.03 mol. % terminal vinyldimethylsiloxy units and 0.08 mol-% vinylmethylsiloxy units and a viscosity of $20*10^3$ Pa·s at 25° C. as component (i). The composition further comprises 29 parts per weight of a fumed silica having a BET-surface of ca. 200 m²/g, which has been treated with 6 wt.-% of octamethylcyclotetrasiloxane as component (v), 1 part per weight of an α,ω-dihydroxydimethylsiloxane having a content of OH-groups of 6.5 wt.-% as component (vi).

All components (i), (v) and (vi) are admixed in a kneader at 50-65° C. for 90 minutes and then for additional 15 minutes together with 1.3 part per weight with a trimethylsiloxy-terminated polyhydrogenmethyl-dimethylsiloxane as component (iii) having a content of SiH-groups of 8.9 mmol/g and a viscosity of 45 mPa·s. Subsequently the aforementioned composition is admixed for 10 minutes under exclusion of light or under 'yellow' light with $\eta^5$-(methylcyclopentadienyl)-trimethyl-platinum according to 4 ppm platinum calculated as metal related to the components (i) to (iii) as component (iv). The total amount of the vinyl units in the soluble components (i) to (iii) was 0.11 mol. % whereas the total amount of the vicinal Si-vinyl groups calculated for the composition (i) to (iii) was 0.00012 mol. %.

This composition was extruded through a die for shaping a tube having an outer diameter of 5 mm and an inner diameter of 3 mm at an extrusion rate of 2.4 m/min subsequently passed downstream a mercury doped UV-lamp (one sided placed) having a length of 10 cm and a power of 2 kW. A tube having the dimension of an outer diameter 5 mm and an inner diameter 3 mm maintained its shape over more than 1 min after the shaping process through the die if it is not photoactivated or the catalyst is omitted.

After passing the UV-channel the extruded tube was almost completely cured and could be stored without any problems.

Example 4

100 parts per weight of a polydimethylsiloxane having 0.03 mol. % terminal vinyldimethylsiloxy units and 0.18 mol-% vinylmethylsiloxy units and a viscosity of $16*10^3$ Pa·s at 25° C. ($P_n$=7500) as component (i). The composition further comprises 45 parts per weight of a fumed silica having a BET-surface of ca. 200 m²/g as component (v), 6.5 parts per weight of an α,ω-dihydroxydimethyl-siloxane having a content of OH-groups of 7.5 wt.-% as component (vi) and 0.5 parts per weight of hexamethyldisilazane as component (vi).

All components (i), (v) and (vi) are admixed in a kneader at 120° C. for 90 minutes and then for additional 120 min at 160° C. the volatiles were evaporated and externally condensed.

After cooling down to 65° C. the composition was admixed together with 1 part per weight of a trimethylsiloxy-terminated polyhydrogenmethyl-dimethylsiloxane as component (iii) having a content of SiH-groups of 7.4 mmol/g and a viscosity of 40 mPa·s for 15 minutes.

The aforementioned composition is admixed for 10 minutes under exclusion of light or under 'yellow' light with $\eta^5$-(methylcyclopentadienyl)-trimethyl-platinum according to 4 ppm platinum calculated as metal related to the components (i) to (iii).

The total amount of the vinyl units in the components (i) to (iii) was 0.21 mol. % and the calculated total amount of vicinal Si-vinyl for the components (i) to (iii) soluble in $CDCl_3$ is 0.00044 mol. %.

The composition could be extruded under the same conditions as those used in example 1. A continuously extruded tube could be collected about 1 m after the irradiation channel. The transparent elastomeric tube could be almost completely cured and could be wound up and stored without any problems.

Also a shaped test sheet of this composition having a thickness of 2 mm was exposed for 5, 10 and 120 sec. to the irradiation of an iron doped UV-lamp having a length of 10 cm and a power of 2 kW with a distance of 4 cm.

A hardness of 36, 38 and 47° Shore A was measured for a sheet of 3×2 mm, and 44, 45 and 51° Shore A for each 2 mm sheet, which shows that the composition can be cured after an irradiation time reasonable for an extrusion operation.

The Mooney viscosity was measured to be $MI_0/MI_4$=39/33 units.

When this material was placed in a lab extruder having srew diameter of example 1a tube with the dimension of example 1 could be continuously shaped.

The extrusion rate was 1.7 m/min. The extruded tube exposed to the lamp of example 1 has almost no tacky feeling. When the shaped tube was not photoactivated after passing the die or the catalyst (iv) is omitted then the shaped form after the die could be maintained over more than 1 min.

Example 5

85 parts per weight of a polydimethylsiloxane having 0.03 mol. % terminal vinyldimethylsiloxy units and 0.18 ml-% vinylmethylsiloxy units and a viscosity of $16*10^3$ Pa·s at 25° C. ($P_n$ 7500) and 15 parts per weight of a polydimethylsiloxane having 0.035 mol. % terminal vinyldimethylsiloxy units and 5.4 mol-% vinylmethyl-siloxy units and a viscosity of $10*10^3$ Pa·s at 25° C. ($P_n$=6000), both as component (i).

The composition further comprises 45 parts per weight of a fumed silica having a BET-surface of ca. 200 m²/g as component (v), 6.5 parts per weight of an α,ω-dihydroxydimethylsiloxane having a content of OH-groups of 7.5 wt.-% as component (vi), and 0.5 parts per weight of hexamethyldisilazane.

All components are admixed in a kneader at 120° C. for 90 minutes and then for additional 120 min at 160° C. the volatiles were evaporated and externally condensed.

After cooling down to 65° C. the composition was admixed together with 2.7 parts per weight of a trimethylsiloxy-terminated polyhydrogenmethyl-dimethylsiloxane as component (iii) having a content of SiH-groups of 7.4 mmol/g and a viscosity of 40 mPa·s for 15 minutes.

The aforementioned composition is admixed for 10 minutes under exclusion of light or under 'yellow' light with $\eta^5$-(methylcyclopentadienyl)-trimethyl-platinum according to 4 ppm platinum calculated as metal related to the components (i) to (iii).

The total amount of the vinyl units in the components (i) to (iii) was 0.99 mol.-% and the total amount of the vicinal Si-vinyl groups for the components (i) to (iii) was calculated to be 0.045 mol. % as sum of the weighted individual concentrations in each of the polymers in the mixture of component (i) to (iii).

A shaped test sheet of this composition having a thickness of 2 mm was exposed for 60 sec. to the irradiation of an iron doped UV-lamp having a length of 10 cm and a power of 2 kW. The article is cured to a certain extent but the hardness could not be measured in a satisfactory manner according to a standard method.

In a second run the irradiation time was extended to 150 sec, the tube appears to be more elastic than after 60 sec but it has not been fully cured.

This example shows that the degree of cross-linking achieved for a certain period of irradiation depends on the content of the vicinal alkenyl groups. Accordingly a lower content of vicinal alkenyl groups is preferred in order to reduce irradiation time required for cross-linking in the extrusion line.

Example 6

Example 1 was repeated with a modified concentration level of the catalyst (iv), which is now adjusted to 8 ppm platinum related to the components (i) to (iii). The composition was extruded to a tube having the dimension of an outer diameter of 10 mm and an inner diameter of 3 mm (0.375/0.125 inches) using a single screw extruder having an L/D of 10.5:1, srew diameter 6.35 cm (2.5 inch) compression rate/progression of 2.6:1, and a belt speed of 4 m/min (13 ft/min) while passing a 15.2 cm (6 inch) iron halide lamp having a power of 2.82 kW (0.47 kW per inch).

The extrudate is already cured to a certain extent but is still a little bit tacky.

Example 7

The example 6 was repeated with a modified concentration level of the catalyst (iv) which is now adjusted to 16 ppm Pt. The composition was shaped to a tube having the dimension of an outer diameter of 16 mm and an inner diameter of 3 mm (0.625/0.125 inches) and a belt speed of 7 m/min (23 ft/min) while passing a 15.2 cm (6 inch) iron halide lamp having a power of 0.47 kW per inch.

The extrudate is almost completely cured having a hardness of 46° Shore A, with no tackiness of the surface.

Example 8 (Comparative)

The composition of example 4 was mixed again wherein the polydimethylsiloxane (i) having terminal vinyldimethylsiloxy and vinylmethylsiloxy units was replaced by a polydimethylsiloxanes having a viscosity of 1 kPa·s at 25° C. and an average number of siloxy units of 2500.

When this material was placed in lab extruder of example 1 for shaping a tube with dimension of example 1 then an extrusion rate of 2.1 m/min at 24 RPM could be achieved.

But the form of the tube not photoactivated could not be maintained, the tube collapsed 1 cm after the shaping die of the extruder to a flat strand, corresponding to not more than 2 sec after passing the shaping die. The Mooney viscosity was measured to be $MI_4$=19 units.

The surface of the non-cured tube is tackier than that of the non-cured tube of example 4 or 2. The example shows that polymer (i) for continuous shaping process must have a minimum viscosity i.e. chain length to maintain the shaped form during the curing process.

The invention claimed is:

1. A shaped co-extrudate comprising a light-cured silicone extrudate in association with at least one further extruded material, said light-cured silicone extrudate being obtained by a process comprising the following steps:
    a) a shaping step, comprising the continuous shaping of a mixture comprising:
        (i) at least one linear polyorganosiloxane having at least three alkenyl groups and an average number of diorganosiloxy units determined by GPC with polystyrene as standard of at least 3000,
        (ii) optionally one or more polyorganosiloxane having alkenyl groups, other than the polyorganosiloxane according to the component (i),
        (iii) at least one polyorganosiloxane having at least two SiH groups,
        (iv) at least one photoactivatable transition metal catalyst, which is photoactivatable with UV light of a wavelength in the range of 190 to 500 nm, said catalyst being an organometallic complex compound having at least one selected from the group consisting of a sigma-bonded alkyl group and a sigma-bonded aryl group,
        (v) optionally at least one filler,
        (vi) optionally at least one conventional additives,
        in a shaping apparatus, thereby obtaining a shaped silicone article,
    b) at least one irradiation step to photoactivate the photoactivatable transition metal catalyst, comprising irradiation with UV light of a wavelength of 190 to 500 nm,
    c) optionally one or more heat treatment steps,
    d) optionally one or more mixing steps,
    e) optionally one or more cutting and/or winding and/or packaging steps of the continuously shaped cured silicone article.

2. The shaped co-extrudate according to claim 1 having the form of a sheet, a tube, a cable, a cable jacket, a profile, or a sheathing.

3. The shaped co-extrudate according to claim 1, wherein in the shaping step, the polyorganosiloxane (i) has at least one pendant alkenyl group.

4. The shaped co-extrudate according to claim 1, wherein in the shaping step, the part of the uncured mixture of the components (i) to (vi), which is soluble in $CDCl_3$ at 25° C., has a content of vicinal Si-alkenyl groups of less than 0.025 mol. %.

5. The shaped co-extrudate according to claim 1, wherein in the shaping step, the polyorgano-siloxanes (i) have a viscosity of at least 1.5 kPa*s (25° C.; at a shear rate of 1 $s^{-1}$).

6. The shaped co-extrudate according to claim 1, wherein in the shaping step, the mixture to be shaped comprising the components (i), (iii), (iv) and optionally (ii), (v) and (vi), has a viscosity of at least of 10 Mooney units.

7. The shaped co-extrudate according to claim 1, wherein in the shaping step, the photoactivatable transition metal catalyst is selected from the group of transition metal complex compounds having sigma-bonded ligands.

8. The shaped co-extrudate according to claim 1, wherein in the shaping step, the photoactivatable transition metal catalyst is selected from the group of transition metal complex compounds having at least one ligand selected from the group consisting of cyclopentadienyl, cyclooctadiene, cyclooctatetraene, norbornadiene.

9. The shaped co-extrudate according to claim 1, wherein in the shaping step, the filler is at least one reinforcing filler.

10. The shaped co-extrudate according to claim 1, wherein in the shaping step, the shaping apparatus comprises at least one shape forming die.

11. The shaped co-extrudate according to claim 1, wherein the shaping step is an extrusion step and wherein the shaping apparatus is an extruder.

12. The shaped co-extrudate according to claim 11, wherein in the shaping step, the extruder is selected from the group consisting of single-screw extruders, twin screw extruders and gear extruders.

13. Glass fiber insulation comprising the shaped light-cured extrudate obtained by a process for the manufacture of shaped cured silicone articles comprising the following steps:
   a) a shaping step, comprising the continuous shaping of a mixture comprising:
      (i) at least one linear polyorganosiloxane having at least three alkenyl groups and an average number of diorganosiloxy units determined by GPC with polystyrene as standard of at least 3000,
      (ii) optionally one or more polyorganosiloxane having alkenyl groups, other than the polyorganosiloxane according to the component (i),
      (iii) at least one polyorganosiloxane having at least two SiH groups,
      (iv) at least one photoactivatable transition metal catalyst, which is photoactivatable with UV light of a wavelength in the range of 190 to 500 nm, said catalyst being an organometallic complex compound having at least one selected from the group consisting of a sigma-bonded alkyl group and a sigma-bonded aryl group,
      (v) optionally one or more fillers,
      (vi) optionally one or more conventional additives,
      in a shaping apparatus, thereby obtaining a shaped silicone article,
   b) at least one irradiation step to photoactivate the photoactivatable transition metal catalyst, comprising irradiation with UV light of a wavelength of 190 to 500 nm,
   c) optionally one or more heat treatment steps,
   d) optionally one or more mixing steps,
   e) optionally one or more cutting and/or winding and/or packaging steps of the continuously shaped cured silicone article.

14. A continuous extrusion process for the manufacture of cured silicone extrudates, comprising:
   mixing the following components:
   at least one linear polyorganosiloxane having at least three alkenyl groups and an average number of diorganosiloxy units determined by GPC with polystyrene as standard of at least 3500,
   (ii) optionally one or more polyorganosiloxane having alkenyl groups, other than the polyorganosiloxane according to the component (i),
   (iii) at least one polyorganosiloxane having at least two SiH groups,
   (iv) at least one photoactivatable transition metal catalyst, which is photoactivatable with UV light of a wavelength in the range of 190 to 500 nm, said catalyst being an organometallic complex compound having at least one ligand selected from the group consisting of a sigma-bonded alkyl group and a sigma-bonded aryl group,
   (v) optionally one or more fillers,
   (vi) optionally one or more conventional additives,
   feeding said mixture obtained into an extruder,
   extruding said mixture through a die to obtain a continuously formed extrudate,
   conveying said extrudate obtained to an irradiation stage,
   irradiating said extrudate with light of a wavelength in the range from 190 to 500 mm to obtain a continuously formed, cured silicone extrudate,
   collecting said continuously formed, cured silicone extrudate, and
   optionally cutting said continuously formed, cured silicone extrudate.

15. The continuous extrusion process according to claim 14, wherein the polyorganosiloxane (i) has at least one pendant alkenyl group.

16. The continuous extrusion process according to claim 14, wherein the part of the uncured mixture of the components (i) to (vi), which is soluble in $CDCl_3$ at 25° C., has a content of vicinal Si-alkenyl groups of less than 0.025 mol. %.

17. The continuous extrusion process according to claim 14, wherein the polyorgano-siloxanes (i) have a viscosity of at least 1.5 kPa*s (25° C.; at a shear rate of 1 $s^{-1}$).

18. The continuous extrusion process according to claim 14, wherein the mixture to be shaped comprising the components (i), (iii), (iv) and optionally (ii), (v) and (vi), has a viscosity of at least of 1.0 Mooney units.

19. The continuous extrusion process according to claim 14, wherein the photoactivatable transition metal catalyst is selected from the group of transition metal complex compounds having at least one ligand selected from the group consisting of cyclopentadienyl, cyclooctadiene, cyclooctatetraene, norbornadiene.

20. The continuous extrusion process according to claim 14, wherein the at least one filler is at least one reinforcing filler.

21. The continuous extrusion process according to claim 14, wherein the extruder is selected from the group consisting of single-screw extruders, twin screw extruders and gear extruders.

22. The continuous extrusion process according to claim 14, wherein the components (i) to (vi) are present in the amounts of:
   (i) 100 parts by weight,
   (ii) 0 to 100 parts by weight,
   (iii) 0.1 to 30 parts by weight,
   (iv) 1 to 100 ppm (referring to the amount of the transition metal in the photoactivatable transition metal catalyst in relation to the total amount of components (i) to (iii)),
   (v) 0 to 100 parts by weight, and
   (vi) 0 to 15 parts by weight.

* * * * *